United States Patent
Giefer et al.

(10) Patent No.: US 10,047,852 B2
(45) Date of Patent: Aug. 14, 2018

(54) MODULAR ACTUATOR FOR VEHICLE TRANSMISSIONS

(75) Inventors: Andreas Giefer, Lemfoerde (DE); Ludger Rake, Steinfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1069 days.

(21) Appl. No.: 13/697,399

(22) PCT Filed: Apr. 21, 2011

(86) PCT No.: PCT/EP2011/056403
§ 371 (c)(1),
(2), (4) Date: Mar. 5, 2014

(87) PCT Pub. No.: WO2011/141285
PCT Pub. Date: Nov. 17, 2011

(65) Prior Publication Data
US 2014/0174233 A1    Jun. 26, 2014

(30) Foreign Application Priority Data

May 12, 2010 (DE) .......................... 10 2010 028 965

(51) Int. Cl.
*F16H 59/02* (2006.01)
*F16H 59/10* (2006.01)
(Continued)

(52) U.S. Cl.
CPC .............. *F16H 59/10* (2013.01); *B60K 20/04* (2013.01); *B60K 20/08* (2013.01); *F16H 59/02* (2013.01);
(Continued)

(58) Field of Classification Search
CPC ..... F16H 2059/0273; F16H 2059/0265; F16H 2059/0269; F16H 2059/026;
(Continued)

(56) References Cited

U.S. PATENT DOCUMENTS 5,144,853 A * 9/1992 Giudici ................. B60K 20/04
                                                                    180/334
5,651,290 A * 7/1997 Osborn ............. B60R 25/02144
                                                                     70/247
(Continued)

FOREIGN PATENT DOCUMENTS

DE           41 15 835        11/1991
DE     10 2007 005 496         7/2008
(Continued)

OTHER PUBLICATIONS

German Patent Office, Search Report of German Patent Application No. 10 2010 028 965.5, dated Apr. 6, 2011, pp. 1-4.
(Continued)

*Primary Examiner* — David M Fenstermacher
(74) *Attorney, Agent, or Firm* — Brinks Gilson & Lione

(57) ABSTRACT

An actuator for selecting shift stages of a vehicle transmission comprises a lever housing, a selector lever, as well as a transfer device for transferring switching commands to the speed change gear. The actuator is characterized by am exchangeable module adapter which is arranged between the lever housing and the transfer device. The module adapter has the purpose of adapting the actuator in such a way that the ergonomic point of the actuator can be changed in vertical and/or horizontal direction and thus be adapted to different situations of assembly. The actuator can be adapted to be installed in different vehicle types primarily by selecting the appropriate module adapter and without requiring considerable structural changes.

20 Claims, 3 Drawing Sheets

Figure 1:
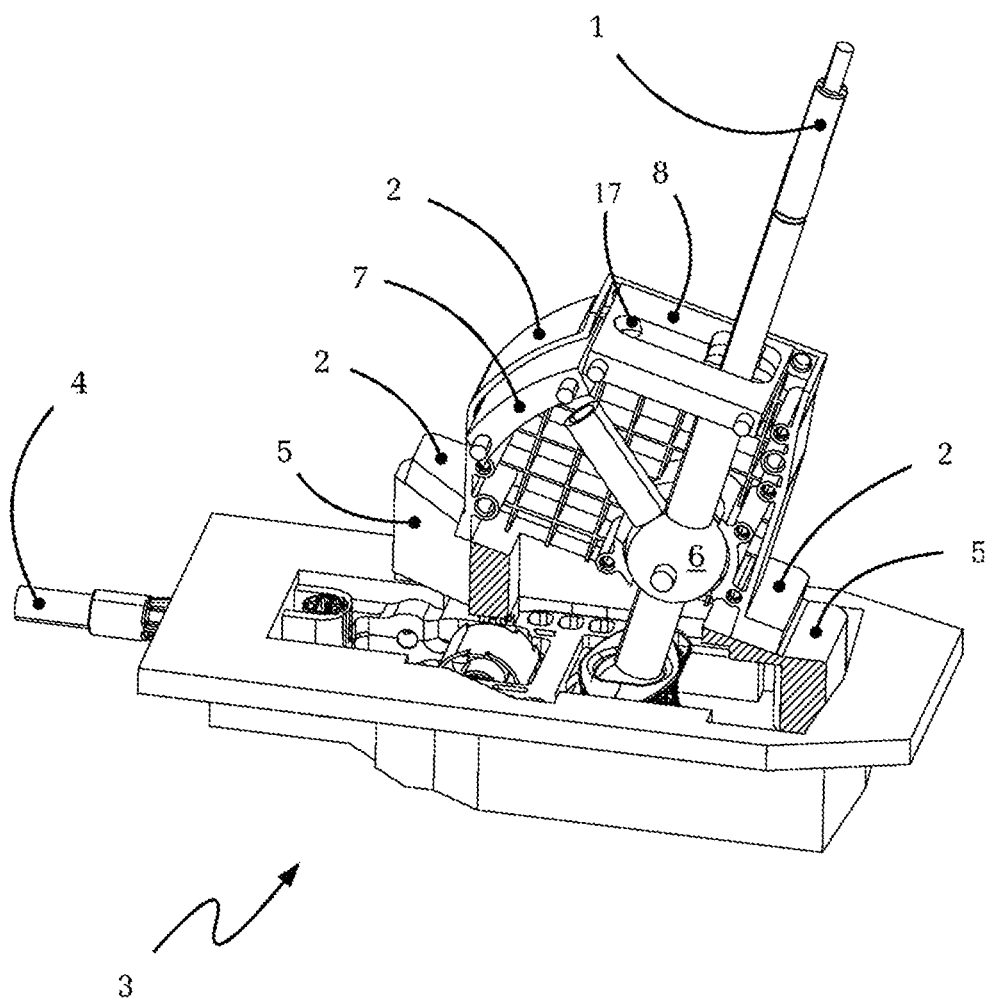

(51) Int. Cl.
*B60K 20/04* (2006.01)
*B60K 20/08* (2006.01)

(52) U.S. Cl.
CPC ..... *F16H 2059/026* (2013.01); *Y10T 74/2014* (2015.01)

(58) Field of Classification Search
CPC ..... F16H 2059/0295; F16H 2059/0282; F16H 59/02; F16H 59/04; F16H 59/105; F16H 59/10; F16H 59/0204; F16H 63/34; F16H 63/3408; F16H 2061/241; F16H 2061/242; F16H 2061/223; F16H 61/24; F16H 61/22; F16H 2063/005; F16H 2063/204; B60K 20/04; G05G 9/02
USPC .......................................... 74/473.14, 473.15
See application file for complete search history.

(56) References Cited

U.S. PATENT DOCUMENTS

| | | | | |
|---|---|---|---|---|
| 5,791,197 | A * | 8/1998 | Rempinski | F16H 59/0204 74/473.18 |
| 5,857,938 | A * | 1/1999 | Porter | F16H 59/04 477/99 |
| 6,325,196 | B1 * | 12/2001 | Beattie | F16H 59/0204 192/220.4 |
| 6,568,294 | B2 * | 5/2003 | Jezewski | F16H 59/0204 116/28.1 |
| 8,312,786 | B2 * | 11/2012 | Ueta | F16H 59/0204 74/473.23 |
| 8,448,536 | B2 * | 5/2013 | Giefer | F16H 59/044 74/335 |
| 8,863,603 | B2 * | 10/2014 | Patzold | F16H 59/0204 74/473.25 |
| 2003/0140721 | A1 * | 7/2003 | Kramer | F16H 59/042 74/473.3 |
| 2008/0072698 | A1 * | 3/2008 | Hirano | F16H 59/0204 74/473.21 |
| 2010/0107800 | A1 * | 5/2010 | Sickart | F16H 59/10 74/473.23 |
| 2010/0160110 | A1 * | 6/2010 | Tseng | F16H 59/044 477/20 |

FOREIGN PATENT DOCUMENTS

| | | |
|---|---|---|
| DE | 10 2009 022 464 | 11/2010 |
| FR | 2 863 555 | 6/2005 |
| JP | H03-98132 U | 10/1991 |
| JP | H05-12244 U | 2/1993 |
| JP | H05-312248 A | 11/1993 |
| JP | 81-92 651 | 7/1996 |
| JP | 2000-326743 | 11/2000 |
| JP | 2009-269598 A | 11/2009 |

OTHER PUBLICATIONS

ISA/EP, International Search Report and Written Opinion of International Application No. PCT/EP2011/056403, dated Jun. 28, 2011, pp. 1-11.

ISA/EP, English Translation of International Search Report of International Application No. PCT/EP2011/056403, dated Jun. 28, 2011, pp. 1-4.

Office Action from corresponding JP Application No. 2013-509489 dated Jan. 7, 2014 (4 pgs).

* cited by examiner

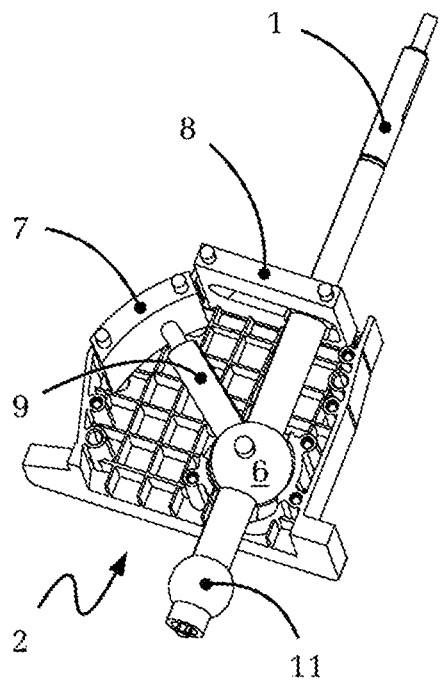
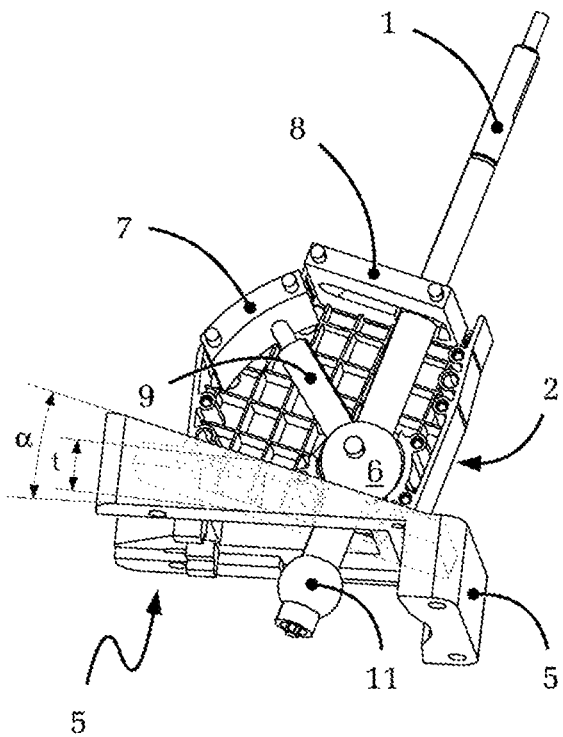
Fig. 2          Fig. 3
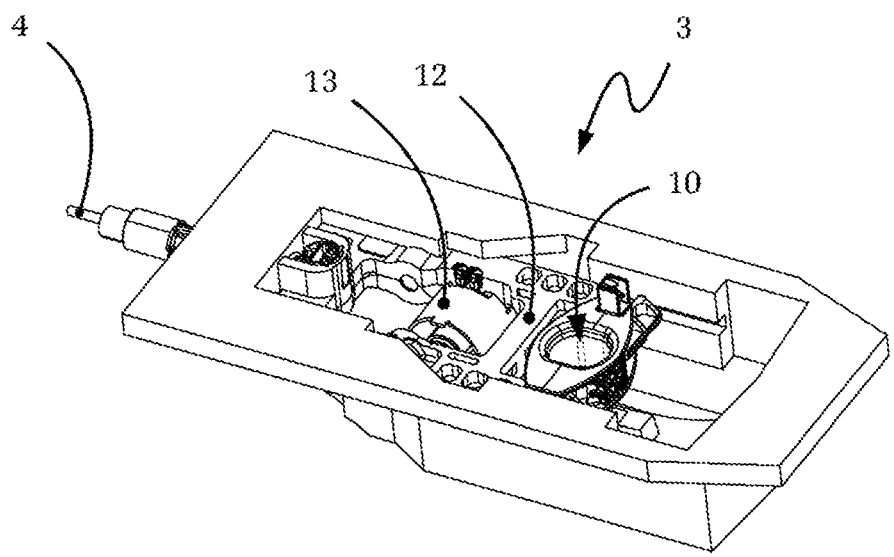
Fig. 4

MODULAR ACTUATOR FOR VEHICLE TRANSMISSIONS

This application is a filing under 35 U.S.C. § 371 of International Patent Application PCT/EP2011/056403, filed Apr. 21, 2011, which claims priority to German Application No. 10 2010 028 965.5, filed May 12, 2010, each of which is incorporated by reference herein in its entirety.

The invention relates to an actuator, especially for selecting shift stages of a vehicle transmission according to the preamble of Claim 1.

Usually, in a vehicle transmission, selection of shift stages or control of gear-shifting programs takes place by means of an actuator arranged within the reach of a driver. Typically, actuating elements such as gearshift or selector levers are used for this purpose, which are, for example, arranged between the front seats of the motor vehicle or in different areas of the vehicle interior.

In most cases, such actuators are developed for a particular vehicle type. This has to do with the fact that in different vehicle types, the requirements regarding accessibility and ergonomics of the actuator, as well as the constructive basic conditions of assembly differ to the extent so that it is generally not possible to use a constructively uniform actuator in different types of vehicles.

Moreover, the difficulty regarding the required constructive diversity of actuators is increased in that, even within vehicle model series, an increasing number of vehicle types are developed (for example, limousine, compact SUV, etc.), which are based on one and the same chassis, each of which could have different requirements regarding positioning of so-called ergonomic points for the gear lever knob (vertical and/or in driving direction horizontal gear lever knob positions).

For reasons of limited strength of the components of the actuator alone, it is often not enough to simply extend or reduce the length of the selector lever, for example, to reach the desired vertical ergonomic point. Changing the height of the selector lever also requires a proportionate alteration of the selector lever path or the distance between the individual switch positions, which, however, may be undesirable.

Furthermore, when assembled in a vehicle, the actuators known from prior art do not always provide the required flexibility, especially with regard to sequence of assembly. Especially in the context of actuators which comprise a mechanical connection between the vehicle transmission and the gearshift or selector lever, for example, for mechanically actuating the parking brake, it is often required that parts of the actuator protrude into the vehicle interior because in such cases the mechanical connection to the transmission is often installed underneath the vehicle floor in a form of an underfloor assembly.

Therefore, the generally known actuators have to be installed either before the vehicle interior is assembled (which can interfere with subsequent assembly of the vehicle interior), or they are installed during the process of assembling the vehicle interior (which can result in potentially extensive underfloor assembly). The actuators consist of several prefabricated subassemblies (modules), for example, selector levers, lever housing, transfer device, and locking mechanism or locking mechanism insert. This results in a modular construction of the actuator.

Against this background, it is the objective of the present invention to provide an actuator—especially for vehicle transmissions—by means of which the disadvantages of prior art mentioned above can be overcome. In particular, it should be possible to use said actuator for a plurality of vehicle types without requiring for each vehicle type a new development or extensive custom modifications of the actuator. At the same time, efforts are made to fulfill in a constructively simple manner ergonomic requirements, especially with regard to positioning the gear lever knob, as well as varying requirements with regard to assembling and the sequence of assembling the actuator.

This problem is solved by means of the characteristics of claim 1.

Preferred embodiments are the subject matter of the sub-claims.

In generally known manner, the actuator according to the present invention is used especially for selecting the shift stages of a speed change gear and, for this purpose, comprises a selector lever positioned between at least two switch positions which can be moved along at least one shift track, as well as a lever housing in which the selector lever is swivel-mounted about a selector lever bearing. Furthermore, the actuator comprises a transfer device for transferring the switching commands to the vehicle transmission.

However, according to the invention, the actuator is characterized by a module adapter which is arranged between the two structural components "lever housing" and "transfer device", wherein the actuator can be adapted to different basic conditions, for example, different assembly situations with various ergonomic requirements, by selecting a specific module adapter from a plurality of available module adapters. In particular, by selecting a specific module adapter, the ergonomic point of the actuator, or the position of the knob in vertical and/or horizontal direction, can be adapted in any desired way to the basic assembly conditions of a specific vehicle type.

In other words, this means that the invention-based actuator can be divided in modular manner in a lever-sided, prefabricated component comprising the lever housing and the selector lever contained therein, and in a transfer-sided, also prefabricated component in the form of the transfer device for transferring the switching commands to the transmission. At the same time, according to the present invention, a basically plate-shaped or wedge-shaped module adapter, or adapter, is arranged between the lever-sided component and the transfer-sided component.

As a result, by providing, selecting, and assembling a module adapter with specific dimensions, a variety of actuators with different ergonomic points, i.e., vertical and/or (in driving direction) horizontal positions of the gearlever knob, can be prepared without requiring a new or a re-construction of the entire actuator.

Based on the invention, it is therefore possible to provide for a variety of vehicle types the respectively appropriate actuator, wherein it is possible to adapt especially the so-called ergonomic point, i.e., the vertical and/or horizontal position of the gear lever knob in the interior of the vehicle, to the respective vehicle package, for example, the location and position of the vehicle seats. Using the modular design in which merely the module adapter has to be changed or exchanged in order to adapt it to a new or additional vehicle type would result in considerable simplification and saving of expenses with regard to construction, production, and assembly of the actuator.

In general, the invention is achieved independent of the structural design of the module adapter as long as the module adapter is able to uphold the function of the modularly variable connection between the lever housing and the transfer device.

However, preferred embodiments of the invention provide that module adapters with different thickness and height dimensions for adapting the ergonomic point of the actuator in vertical direction, and/or module adapters with different angles (between the contact surfaces of the module adapter to the lever housing or to the transfer device) in order to adapt the ergonomic point in the horizontal (and/or vertical) direction.

Thus, by selecting and assembling an appropriate module adapter it is possible to variably determine within broad limits the vertical position of the ergonomic point (i.e., the gear lever know), as well as the horizontal position of the ergonomic point (or the angle of inclination of the selector lever in its starting position), by means of which the ergonomic point or the position of the gear lever knob can be adapted to a variety of assembly situations and basic conditions.

On the one hand, the module adapter can be provided as a separate component. However, on the other hand, it is also possible and intended by a further embodiment of the invention that the module adapter is designed to form one piece with the lever housing or the housing of the transfer device. For example, this can be carried out in that a tool with interchangeable inserts is used for producing the lever housing or the housing of the transfer device (in this case with an integrally formed module adapter, respectively), which tool, depending on the interchangeable insert, produces a lever housing or a housing of the transfer device with the respectively desired integrally formed module adapter. Thus, even with this embodiment, it is possible to provide with minimal constructive and fabrication expense a plurality of different actuators, each having an ergonomic point adjusted to different basic conditions.

Moreover, against the background of even greater versatility of the invention-based actuator, provision has been made on the basis of a further, especially preferred embodiment of the invention to provide and select a selector lever adapted to the respective basic vehicle conditions, especially for adapting the actuator to different module adapters, wherein selector levers with different length dimensions are provided for this purpose. On the one hand, by using such an interchangeable modular selector lever with different length dimensions (especially depending on the selected module adapter), it is possible to ensure that the transfer-sided end of the selector lever engages in the transfer device. On the other hand, the respectively desired gear shifting paths or distances of the switch positions at the gear lever knob can be realized by appropriately combining the module adapter and height of the selector lever, even independently from the selected ergonomic point, i.e., form the actual vertical and/or horizontal position of the gear lever knob.

In other words, by combining the selection of module adapters and the respectively appropriate selector lever, it is possible to change to the greatest extent possible and independently from one another the vertical and horizontal position of the gear lever knob, the angular position of the selector lever, as well as the switching intervals at the gear lever knob and to largely adapt them to the basic conditions of assembly of the respective vehicle type.

First of all, this applies independent of how any selector lever locking mechanism is realized. For example, the selector lever locking mechanism can be realized even in the transfer device, for example, by means of an appropriate actuator system or respective locking recesses. However, according to a further preferred embodiment of the invention, the actuator comprises also an interchangeable modular locking mechanism insert for adapting the actuator to different requirements regarding the selector lever locking mechanism.

In this way, it is also possible to adapt the selector lever locking mechanism to the requirements of the respective vehicle type and the respective interior package with regard to the locking intervals and the number of locking positions. All in all, this results in even greater variability of the invention-based actuator.

In a similar manner, a further embodiment of the invention provides that the actuator comprises a interchangeable modular gear shifting gate for adapting the actuator to different shift patterns. All in all, this results in an almost complete modular-based actuator which can be adapted to different requirements by merely exchanging individual modules.

Furthermore, the invention is implemented independent of the structural design of the transfer device. However, based on the premise that there is at least a partial mechanical connection between actuator and vehicle transmission, especially for the purpose of mechanically actuating the parking brake, a further embodiment of the invention provides that the transfer device comprises a slide device.

By means of the slide device, it is possible to convert the swivel movement of the gearshift selector lever in a simple manner into a linear movement, for example, for actuating a lever arm or Bowden cable, which connects the actuator with the vehicle transmission. Furthermore, it is possible to integrate additional functionalities of the actuator in the slide device, especially electromechanic locks or even actuators for changing, restricting or locking the gear shifting path of the actuator.

Against this background, a further preferred embodiment of the invention provides that the transfer device comprises the switching electronics and/or the switching electromechanics. In this way, the majority of primary functions of the actuator can be concentrated and combined in the transfer device. This means that especially the slide system for engaging with the selector lever, the adapter for the Bowden cable, the selector lever electronics and possible electromechanic locks or actuators are completely available in a compact unit in the form of the transfer device. At the same time, the transfer device as a unit remains unchanged to the greatest extent possible, independent from any vehicle type, while an adaption to the respective vehicle merely can now take place by means of the module adapter and, if required, by means of the interchangeable locking mechanism insert and/or a selection of the appropriate height of the selector lever.

In particular, it is also possible in this way to preassemble the transfer device with all integrated functions of the actuator (as well as the complete Bowden cable to the transmission and the electrical connection of the transfer device) completely independent from the lever housing and the actual selector lever. Module adapter, lever housing and selector lever can be completed and assembled at a later point in time, especially during the interior assembly of the vehicle. At the same, the transfer device and the Bowden cable can be assembled underfloor prior to the interior assembly of the vehicle, as provided by a further embodiment of the invention, while the lever housing with the selector lever is installed in the interior of the vehicle at a later point in time.

Figure 5:
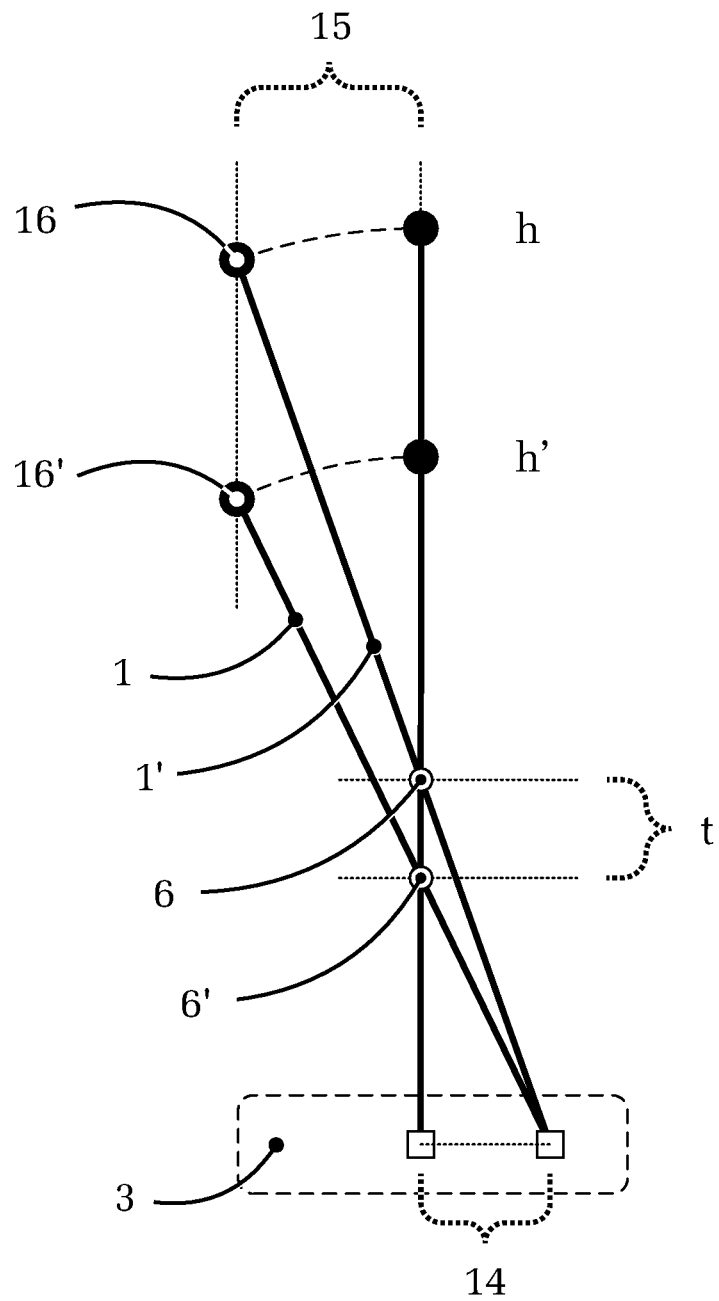

Subsequently, the invention is described in more detail by means of drawings which involve only exemplary embodiments. It is shown:

FIG. 1 an isometric view of an actuator according to a preferred embodiment of the present invention;

FIG. 2 an isometric view of a lever housing and a selector lever of the actuator according to FIG. 1;

FIG. 3 a representation of the lever housing and selector lever with an attached module adapter, according to the actuator shown in FIGS. 1 and 2;

FIG. 4 an isometric view of a transfer device with a Bowden cable of the actuator according to FIGS. 1 to 3; and FIG. 5 a diagram of the variable selector lever geometry a preferred embodiment of the present invention.

FIG. 1 shows an actuator according to a preferred embodiment of the present invention. A selector lever 1 is arranged in a lever housing 2 and is swivel-mounted therein by a selector lever bearing 6, such as a ball bearing, such that the selector lever 1 is movable along a shift track 17. The lever housing 1 is shown only partially and is opened so that it is easier to see the components of the actuator.

FIG. 1 also shows a transfer device 3 designed as a module and a Bowden cable 4 extended from the transfer device 3 and connected to a vehicle transmission (not shown). A module adapter 5 is arranged between the transfer device 3 and the lever housing 2. To have a better view, the module adapter 5 is displayed as a cut and for this reason only the drawing-related rear part of the module adapter 5 is shown in FIG. 1.

The module adapter 5 connects the transfer device 3 with the lever housing 2. In the displayed embodiment of the transfer device 3, most functional components of the actuator are arranged, especially the control electronics of the actuator, as well as associated electromechanic components, such as, in particular blocking magnets and possibly actuators. Consequently, the lever housing contains merely the selector lever, the selector lever bearing and possible several mechanic components, here especially a selector lever locking mechanism 7.

First of all, this means that the relative position and the angle between lever housing 2 and transfer device 3 can be changed in many areas when a variety of module adapters 5 are used. In this way, it is possible to adapt the invention-based actuator to an almost limitless number of different vehicle types, each with a wide variety of assembly situations and different requirements regarding the position of the gearlever knob (not shown here) in the interior of the vehicle in relation to the driver's seat.

This makes it possible that the lever housing 2 and the complete transfer device 3 can basically remain unchanged, while the transfer device can be primarily adapted to a different or new vehicle type only by selecting the appropriate module adapter and, if required, a selector lever that has been appropriately adapted in height.

FIGS. 2 to 4 provide a detailed view of the basic components of the transfer device. FIG. 2 shows the rear part of the lever housing 2, as well as the selector lever 1 supported in the lever housing by means of a bearing 6. It is obvious that in the embodiment of the actuator shown in FIGS. 1 to 4, the selector lever locking mechanism 7, as well as the selector lever connecting link 8 are designed as interchangeable, merely inserted modules. By exchanging the selector lever locking mechanism 7 (here shown only as a diagram), which engages with a locking mechanism extension 9 of the selector lever, it is possible to adapt the actuator to different distances between the individual transmission ratios, as well as to different parameters or courses of the locking forces.

Even the selector lever connecting link 8, here designed also as a module, can be provided with little effort in different variations, depending on the requirements regarding the number of shift tracks or selector lever positions, and the actuator can be adapted respectively by selecting an appropriate connecting link module 8.

FIG. 3 shows again the arrangement consisting of lever housing 2, selector lever 1, as well as locking mechanism 7 and connecting link module 8 with the module adapter 5 arranged at the lever housing 2. It is obvious that it is possible to provide the module adapter with very different adapter angle $\alpha$ and different adapter thickness t and to use it for compiling actuators, by means of which it is possible to realize different relative positions and angles (and thus ergonomic points) between selector lever 1 and transfer device. As a result, it is possible with a minimum number of components to adapt in any desired manner the actuator to a plurality of different vehicle types or dimensional requirements of the interior package.

FIG. 4 shows a separate image of the transfer device 3 (see also FIG. 1) of the actuator. In the transfer device 3 there is a calotte-shaped receptacle 10 for the transfer calotte 11 of the selector lever (see FIG. 2 or 3), wherein the force transfer between selector lever 1 and transfer device 3 occurs when the transfer calotte 11 engages in the receptacle 10.

From the calotte-shaped receptacle 10, the actuating force of the selector lever 1 is transferred to a slide device 12 which is connected with the Bowden cable 4. In this way, it is especially possible to mechanically unlock the parking brake. Furthermore, the transfer device 3 comprises the entire sensor system and electronics of the actuator (not shown), as well as possibly electromagnetic locks 13 or motorized actuators for locking or for other functions of the actuator, for example, force feedback. In particular, this means that the transfer device 3 can be assembled in the vehicle, together with the Bowden cable 4 and the complete electric connection of the sensor system or selector lever electronics, independent of the lever housing 2 and the actual selector lever 1, and it is still possible to assemble the lever housing 2 and the selector lever 1 in the vehicle at a later point in time by means of the module adapter 5.

In particular, the transfer device 3 can be assembled in the vehicle underfloor, for example, below the underbody of the vehicle. At the same time, the transfer device 3 can be connected with the transmission by means of the Bowden cable 4 and can be completely electrically wired. However, the lever housing 2, the selector lever 1 and the module adapter 5 are assembled and connected with the transfer device 3 during the process of assembling the interior of the vehicle. This makes it possible that the invention-based actuator can be assembled in especially flexible manner and adapted to various vehicle types.

FIG. 5 shows a diagram of the geometric connections between the Bowden cable path 14, the switch travel 15 of the gearlever knob 16 and the vertical position of the selector lever bearing 6, or the thickness dimension t and the adapter angle $\alpha$ (see FIG. 3) of the module adapter 5. It is obvious that an appropriate selection of the thickness dimensions t and/or the adapter angle $\alpha$ of the module adapter 5 and an appropriate length of the selector lever 1 (or 1') results in an unchanged switch travel 15 of the gearlever knob 16, as well as an unchanged Bowden cable path 14, despite the fact the height h of the gearlever knob or ergonomic point 16 has been changed.

In this way, different ergonomic points 16 or especially height positions h, h' for the gearlever knob 16 in the interior of the vehicle can be achieved while maintaining the position of the transfer device 3, without having to perform structural changes at the other components of the actuator, especially at the transfer device 3 and at the lever housing 2.

As a result, it is clear that the invention provides an actuator, especially for vehicle transmissions which can be installed in a variety of vehicle types without having to perform any noteworthy structural changes. At the same time, the problem of achieving an ergonomically correct position of the gearlever knob in the various vehicle types is solved in a constructively simple manner. The invention also addresses the requirements of assembling the actuator in the most flexible manner and installing it in the vehicle in variable assembly sequence.

Consequently, the invention makes an important contribution of providing actuators for vehicle transmissions in modular design with the potential of considerably simplifying the structure and substantially reducing the costs for construction, production and assembly of said actuators.

REFERENCE LIST

1 Selector lever
2 Lever housing
3 Transfer device
4 Bowden cable
5 Module adapter
6 Selector lever bearing
7 Selector lever locking mechanism
8 Gear shifting gate, connecting link module
9 Locking mechanism extension
10 Calotte-shaped receptacle
11 Transfer calotte
12 Slide device
13 Actuator
14 Bowden cable path
15 Switch travel
16 Gearlever knob, ergonomic point
α Adapter angle
h Gearlever knob height position
t Adapter thickness

The invention claimed is:

1. An actuator for selecting shift stages of a vehicle transmission, comprising:
a lever housing;
a selector lever being movable along at least one shift track, being positioned between at least two switch positions, and being swivel-mounted about a selector lever bearing arranged in the lever housing;
a transfer device for transferring switching commands to a speed change gear; and
an adapter, being arranged between the lever housing and the transfer device to adjust an interface point of the actuator in at least one of a vertical direction and a horizontal direction;
wherein the adapter is arranged to connect the transfer device with the lever housing; and
wherein the transfer device comprises a slide device that receives an end of the selector lever.

2. The actuator according to claim 1, wherein the adapter is provided with at least one of a thickness dimension of the adapter and a height dimension of the adapter for adjusting the interface point in the vertical direction.

3. The actuator according to claim 1, wherein the adapter includes an adaptor angle for adjusting the interface point in the at least one of the horizontal direction and the vertical direction.

4. The actuator according to claim 1, wherein the adapter is integrally formed to one of the lever housing and the transfer device.

5. The actuator according to claim 1, wherein the selector lever is interchangeable for adapting the actuator to at least one dimension of the adapter.

6. The actuator according to claim 1, further comprising an interchangeable selector lever locking mechanism for engaging the selector lever.

7. The actuator according to claim 1, further comprising an interchangeable gear shifting gate for adapting the actuator to different shift patterns.

8. The actuator according to claim 1, wherein the slide device includes a slidable receptacle that moves when the end of the selector lever moves.

9. The actuator according to claim 1, the transfer device comprises at least one of gear-switching electronics and gear-switching electromechanics.

10. The actuator according to claim 1, wherein the transfer device is arranged in an underfloor of the vehicle, independent of the lever housing and adapter.

11. An actuator for selecting shift stages of a vehicle transmission, comprising:
a lever housing;
a selector lever having a first end being movable along at least one shift track, the selector lever being positionable between at least two switch positions through movement of the first end, and being swivel-mounted about a selector lever bearing arranged in the lever housing, the selector lever bearing being located between the first end and a second end of the selector lever;
a transfer device coupled to the second end of the selector lever for transferring switching commands to a speed change gear when the second end of the selector lever moves; and
an adapter, being arranged between the lever housing and the transfer device to determine a location of the first end of the selector lever in at least one of a vertical direction and a horizontal direction,
wherein the transfer device comprises a slide device that receives an end of the selector lever.

12. The actuator according to claim 11, wherein the adapter includes at least one of a thickness dimension of the adapter and a height dimension of the adapter for determining the location in the vertical direction.

13. The actuator according to claim 11, wherein the adapter includes an adaptor angle for determining the location in the at least one of the horizontal direction and the vertical direction.

14. The actuator according to claim 11, wherein the adapter is integrally formed to one of the lever housing and the transfer device.

15. The actuator according to claim 11, wherein the selector lever is interchangeable for adapting the actuator to at least one dimension of the adapter.

16. The actuator according to claim 11, further comprising an interchangeable selector lever locking mechanism for engaging the selector lever.

17. The actuator according to claim 11, further comprising an interchangeable gear shifting gate for adapting the actuator to different shift patterns.

18. The actuator according to claim 11, wherein the slide device includes a slidable receptacle that moves when the end of the selector lever moves.

19. The actuator according to claim 18, wherein linear movement of the slide device actuates at least one of a lever arm or Bowden cable.

20. The actuator according to claim 11, wherein the transfer device is arranged in an underfloor of the vehicle, independent of the lever housing and adapter.

* * * * *